United States Patent [19]

Zaskalicky

[11] Patent Number: 4,533,528
[45] Date of Patent: Aug. 6, 1985

[54] PROCESS FOR CONTINUOUSLY CALCINING GYPSUM TO LOW DISPERSED CONSISTENCY STUCCO

[75] Inventor: Michael F. Zaskalicky, Lutherville, Md.

[73] Assignee: United States Gypsum Company, Chicago, Ill.

[21] Appl. No.: 514,175

[22] Filed: Jul. 15, 1983

[51] Int. Cl.³ .............................................. C04B 11/00
[52] U.S. Cl. .................................... 423/171; 423/555; 423/172
[58] Field of Search ....................... 423/171, 172, 555; 106/109–116

[56] References Cited

U.S. PATENT DOCUMENTS

| 1,370,581 | 3/1921 | Brookby | 106/110 |
| 1,548,358 | 8/1925 | Edwards | 423/170 |
| 1,570,583 | 1/1926 | Wilson | 423/555 |
| 1,900,381 | 3/1933 | Hansen | 106/110 |
| 1,937,292 | 11/1933 | Moore | 106/34 |
| 3,047,447 | 7/1962 | Stasse | 156/40 |
| 3,236,509 | 2/1966 | Blair | 263/21 |
| 4,086,099 | 4/1978 | Prudhon et al. | 106/109 |
| 4,117,070 | 9/1978 | O'Neill | 264/234 |
| 4,153,373 | 5/1979 | O'Neill | 366/165 |
| 4,201,595 | 5/1980 | O'Neill | 106/109 |
| 4,238,445 | 12/1980 | Stone | 264/234 |
| 4,247,518 | 1/1981 | Charlet et al. | 422/142 |
| 4,252,568 | 2/1981 | Bounini | 106/111 |
| 4,344,925 | 8/1982 | Pichat et al. | 423/170 |
| 4,360,386 | 11/1982 | Bounini | 106/110 |

FOREIGN PATENT DOCUMENTS

| 727036 | 2/1966 | Canada | 423/172 |
| 1018464 | 1/1966 | United Kingdom | 423/172 |
| 1087549 | 10/1967 | United Kingdom | 423/172 |

Primary Examiner—L. Dewayne Rutledge
Assistant Examiner—Christopher W. Brody
Attorney, Agent, or Firm—Kenneth E. Roberts; Robert H. Robinson; Samuel Kurlandsky

[57] ABSTRACT

Wet chemical gypsum cake may be directly fed to a continuous kettle calciner to produce a stucco having lowered dispersed consistency. Pre-drying of the chemical gypsum is eliminated and the thus produced stucco may be used in the formulation of building plasters and in gypsum wallboard manufacture that will use less fuel for drying excess gauging water.

9 Claims, 3 Drawing Figures

PROCESS FOR CONTINUOUSLY CALCINING GYPSUM TO LOW DISPERSED CONSISTENCY STUCCO

BACKGROUND OF THE INVENTION

1. Field of the Invention

The present invention relates to gypsum calcination, and more particularly to a process for continuous kettle calcination of chemical gypsum to beta hemihydrate useful in the formulation of building plasters and in gypsum wallboard manufacture.

Chemical gypsum, calcium sulfate dihydrate resulting from an acid neutralization step in any of numerous manufacturing operations, differs from natural mineral gypsum in its chemical impurities and, frequently most importantly, in physical characteristics. Chemical impurities from the production process affect calcination properties and the setting times and strength development of the resultant stucco. Chemical gypsums are generally obtained as very uniform, complete crystallization crystals, particles of very narrow particle size distribution (generally 800–2000 square centimeters per gram Blain surface areas, and mean particle size about 50 micrometers and the majority of the particles are between 10 and 70 micrometers). This affects calcination properties including lengthy times for calcination heat to penetrate the relatively large crystals and only gradual effecting of complete calcination due to the narrow particle size distribution.

Further, the free water associated with the as-produced chemical gypsum cake greatly affects flow and handling properties of the chemical gypsum. Completely dry chemical gypsum flows readily. Chemical gypsum with greater than about 40% free water becomes very free flowing, virtually acting like a fluid. However, wet chemical gypsum with associated free water in between these contents is a virtually immovable, sticky mass. Due to this difficulty with flow and handling chemical gypsum which is to be calcined, as a practical matter, is subjected to a preliminary step of either being slurried with large quantities of water for use in greater than atmospheric pressure calcination to produce alpha hemihydrate, or it is thoroughly dried to less than 1% free water content before attempting atmospheric calcination to produce beta hemihydrate.

2. Description of the Prior Art

This invention treats the gypsum feed with water before calcination as opposed to prior art practices which treat after calcination.

U.S. Pat. No. 1,548,358 pertaining to a batch atmospheric kettle calcination of phosphogypsum, does contain a suggestion that the chemical gypsum might not have to be completely dried as a prerequisite step. That suggestion, however, is for conditions under a batch atmospheric calcination wherein the cold calcination vessel is filled with cold (ambient temperature) materials, gradually heated for a gentle calcination in the uncovered vessel, and when calcination is complete the contents of the kettle are dumped completely before the start of another cycle.

In the more modern continuous fluidized kettle calcination, as exemplified by U.S. Pat. No. 3,236,509, dried mineral gypsum powder is fed to a covered, but air vented and lightly vacuum exhausted, calcination vessel. After a steady state of operation is attained in the vessel, a substantially continuous stream of cold gypsum that has been pre-dried and ground to a finely divided state and with a wide distribution of fragmented particle sizes, is added on top of the fluidized, boiling mass in the kettle. Under such conditions, the thermal shock upon the cold, dry mineral being dropped into the already boiling mass radically fractures the ground gypsum rock fragments, and the resultant stucco (beta hemihydrate) is highly fractured and fissured, as well as being widely distributed in particle size. This causes the stucco to disperse very rapidly in water, and requires high amounts of gauging water to be mixed with the stucco for rehydration to gypsum at customary dispersed consistencies. For purposes of the present invention "dispersed consistency" may be defined as the water volume required to give a standard viscosity or flow when a standard amount by weight of stucco is dispersed by mechanical mixing in a laboratory mixer at high shear intensity and for a standard time to equal mixing encountered in the gypsum board forming line, e.g., 7 seconds, or in an industrial plaster formulation casting mixer, e.g. 60 seconds.

Post calcination methods to improve the properties of stucco from continuous kettle calcination are also known. Thus, U.S. Pat. No. 4,201,595 and related patents teach means to lower the dispersed consistencies of continuously calcined kettle stuccos by an after calcination treatment of the stucco with small amounts of water or various aqueous solutions. These methods require an attendant capitalization cost to provide a healing time for the treated stucco.

Further, it has been common practice for many years to mix proportions of thoroughly dried chemical gypsum containing less than 1% free water into the dry mineral gypsum fed in an atmospheric pressure continuous kettle calcination, e.g. up to about 35% by weight dry chemical gypsum is added to the finely ground rock fragments of widely varying particle size distribution. The calcination of such blends results in a hemihydrate requiring slightly less amounts of gauging water for dispersed consistencies than for mineral gypsum feed.

It is believed that no one has heretofore thought to feed the wet sticky chemical gypsum materials to continuous atmospheric pressure calciners, since such would merely increase energy requirements in evaporating the free water before beginning to calcine the gypsum. In addition, the extreme difficulties in handling wet chemical gypsum would lead persons skilled in the art away from the calcination of wet chemical gypsum.

SUMMARY OF THE INVENTION

The present invention relates to a pre-calcination wetting of the gypsum feed.

It has now been found that despite the handling difficulties of such a feed, a substantially continuous stream of wet chemical gypsum may be fed to a continuous atmospheric pressure kettle calciner to produce a satisfactory stucco for the formation of building plasters and for gypsum wallboard manufacture. Further, it has now been found not only possible to feed chemical gypsum containing amounts of free moisture, generally from about 5 to 40% or more, to the continuous kettle calciner, but also, the results show that as moisture content of the feed increases dispersed consistency decreases almost linearly.

Thus, it is an object and advantage of the present invention to provide a process for directly feeding wet chemical gypsum to a continuous atmospheric pressure calciner to produce a beta hemihydrate that is satisfactory for use in the formulation of building plasters and in gypsum wallboard production.

Still another object is the provision of a process for lowering dispersed consistencies of stucco from gypsum.

Broadly speaking, the above objects and advantages, and others which will become apparent from the ensuing description, are achieved by directly feeding to the upper strata of the hot fluidized mass in a continuous kettle calciner, a stream of wet chemical gypsum and withdrawing a stream of beta hemihydrate of lower consistency.

DESCRIPTION OF THE PREFERRED EMBODIMENTS

Figure 1:
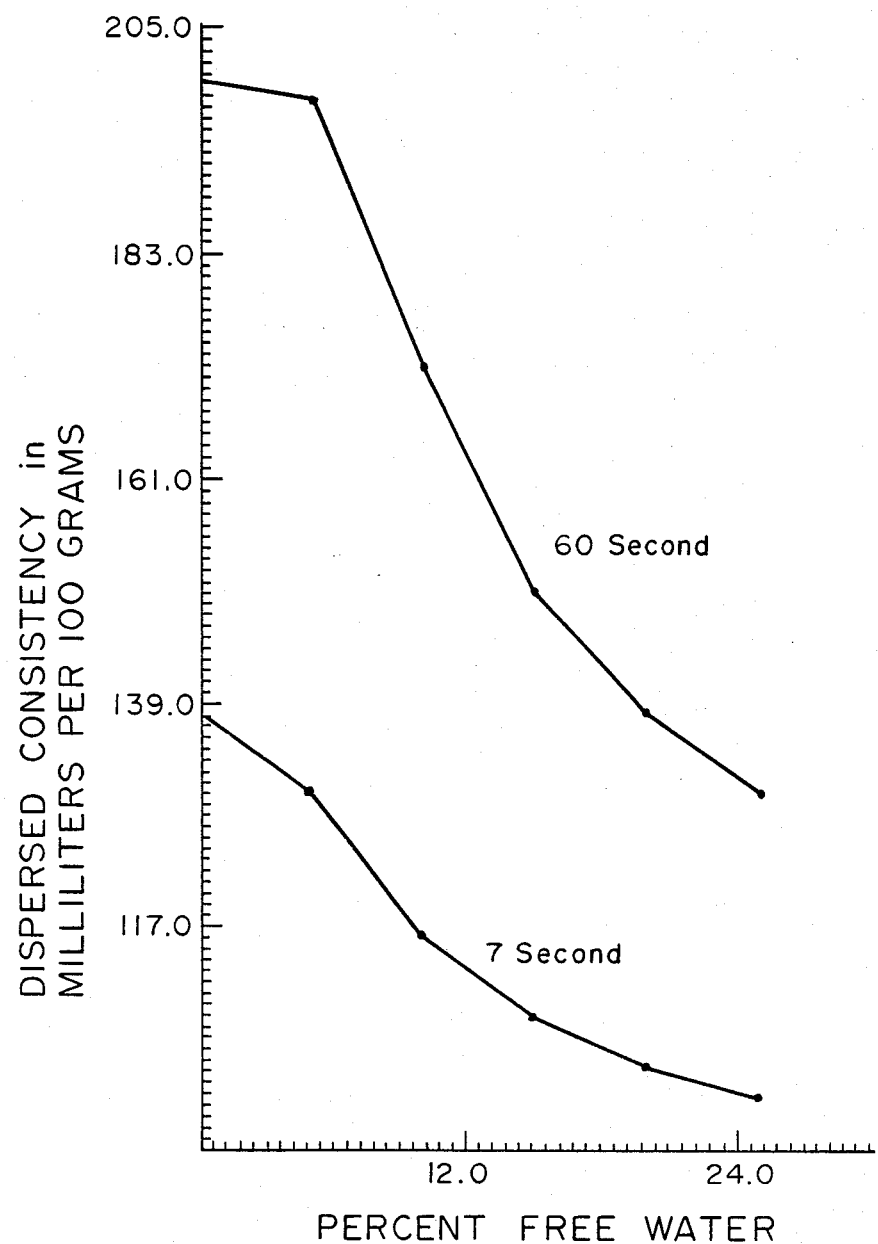
FIG. 1 is a plot of Dispersed Consistency for various stuccos, at both 7 seconds and 60 seconds machine mixing times, versus weight precent of free water content in the chemical gypsum feed used to prepare the stuccos.

In the practice of the present invention, it is preferred to use a chemical gypsum low in chemical impurities; such as chemical gypsum derived from titanium dioxide, citric acid, hydrochloric acid or flue gas desulfurization operations. However, any chemical gypsum may be utilized including fluorogypsum, phosphogypsum and gypsum from neutralization of water treatment facilities. Natural gypsum may be used. In the case of chemical gypsums of higher chemical impurities, the chemical gypsum may be washed with pure water to remove considerable amounts of water soluble chemical impurities, drained and adjusted to appropriate free water content and the resultant wet gypsum directly fed to the calciner. Further natural gypsum may be washed to reduce water soluble impurities, drained and the resultant wet gypsum directly fed to the calciner.

The amount of free water content in the chemical gypsum fed to the calciner may vary widely, generally from about 5-30% or more. Preferably the wet gypsum will contain about 10-25% free water. For each of handling, a wet slurry (e.g. 40-65% free water) may be made for conveying the chemical gypsum to the calciner; and it is blended with a dry (less than 3% free water) gypsum to form a mixture of appropriate wetness for directly feeding to the calciner.

Wet chemical gypsum containing about 5-30% associated free water is difficult to feed into a continuous calciner by the conventional conveyors used with dry powdered mineral. Thus, in one preferred embodiment, wet chemical gypsum of appropriate free water content is fed from storage via a conveyor belt to either a vibratory shaker feed or rotating-screw type feeding mechanism at the inlet of the continuous kettle calciner. The shaker or screw feeder metering means is timed to feed with the operation of the conventional overflow discharge of the continuous kettle. In another preferred embodiment, dry gypsum may be conventionally piped to a stirred blending vessel for blending with water and exit is timed to the discharge of the continuous kettle overflow. In this embodiment, alternatively, a wet chemical gypsum slurry may be fed to a blender via a pipeline or water may be provided to the blender for mixing with dry gypsum to provide a gypsum feed having the appropriate free water content.

The following specific examples will further illustrate various specific embodiments of the process of the present invention. All amounts are expressed as parts by weight unless specified to the contrary. Of course, it is to be understood that these examples are by way of illustration only and are not to be construed as limitations upon the present invention.

EXAMPLE 1

For a first series of evaluations, a quantity of wet chemical gypsum cake as produced in the manufacture of titanium dioxide was obtained. Representative sampling of the material showed it to average 95% calcium sulfate dihydrate with minor amounts of titanium dioxide, calcium carbonate, magnesium carbonate and silica sand. Further sampling showed the material to have a Blaine surface area of 1,200 $cm^2/gm$; mean particle size of 50 micrometers, average free moisture content of 12% and pH of 6.8.

In a first series of evaluations, aliquots of the chemical gypsum having various free water contents were added to a pilot plant sized continuous atmospheric-pressure kettle calciner and the properties of the resultant stuccos were evaluated. The calciner, a 50 lb. capacity vessel, was modified by enlarging the opening for the gypsum feeder, and replacing the conventional powder feeder screw with a vibratory pan. Steady state conditions were established in the kettle, with an exhaust draft being pulled over the kettle of 0.08–0.15 inches of water (0.15–0.285 mm of mercury) and an overflow actuating temperature of 310° F. (154.4° C.). Then aliquots of the chemical gypsum varying from bone dry to 25% free water content were continuously fed to the vessel. With each change over, the free water content was increased after one kettle volume was discharged at the prior free water content level. At 15% free water content levels and above, the metering rate of chemical gypsum fed to the calciner was cut back to lower the kettle contents level to 45 pounds in order to avoid material losses into the exhaust draft line due to the violent boiling of the fluidized calcining mass in the kettle.

Evaluation of physical properties and stucco tests performed on samples of the calcined materials, as follows, show generally linear trends as the moisture content of the chemical gypsum feed increases, resulting in the production of stucco with increased Blaine surface areas, decreased dispersed consistencies, only slightly decreased compressive strengths.

| Free Water in Sample | Dry | 5% | 10% | 15% | 20% | 25% |
|---|---|---|---|---|---|---|
| pH | 6.91 | 6.98 | 7.04 | 7.16 | 7.23 | 7.25 |
| Surface area Blaine $cm^2/g$ | 1821 | 1795 | 1802 | 1946 | 2114 | 2255 |
| mean particle size, $\mu m$ | 51 | 47 | 48 | 42 | 36 | 41 |
| % between 91–128 $\mu m$ | 6.2 | 5.1 | 4.7 | 4.4 | 3.6 | 4.3 |
| % between 1–1.40 $\mu m$ | 1.4 | 1.5 | 1.8 | 1.9 | 2.4 | 2.4 |
| % between 45–64 $\mu m$ | 38 | 33 | 33 | 27 | 18 | 25 |
| Stucco: | | | | | | |
| Vicat set, min. | 23¼ | 19½ | 23½ | 23 | 25½ | 21 |
| Dispersed consistency in ml/100 g. upon | | | | | | |
| 7 seconds mixing | 138 | 130 | 116 | 108 | 103 | 100 |
| 60 seconds mixing | 200 | 198 | 172 | 150 | 138 | 130 |
| formulated plaster; | | | | | | |

| Free Water in Sample | Dry | 5% | 10% | 15% | 20% | 25% |
|---|---|---|---|---|---|---|
| 2 inch cast cubes | | | | | | |
| gauging water, ml/1600 g. | 1450 | 1450 | 1450 | 1450 | 1400 | 1350 |
| Vicat set, minutes | 7 | 6½ | 6½ | 7¼ | 7¼ | 7¼ |
| Dry compressive Strength, % of normal stucco | 135 | 131 | 121½ | 122 | 129 | 121 |

The dispersed consistencies are set forth in FIG. 1 and show almost direct linear correlation between the amount of free water content in the gypsum at time of calcination and the decreases in dispersed consistency of both 7 second mixing and 60 second mixing.

Figure 2:
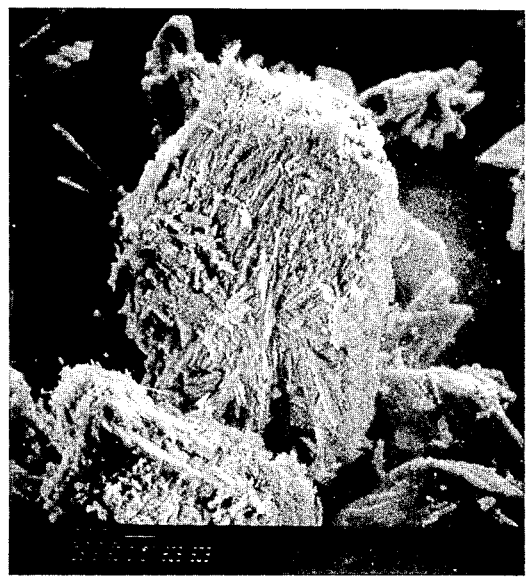
FIG. 2 is a scanning electron microscopic photograph at 500×magnification of stucco from chemical gypsum having 25% free water content.
Figure 3:
FIG. 3 is another photograph at the same magnification of stucco from dry chemical gypsum.

In a further evaluation, sieving and sedimentation particle size distribution histogram comparisons between samples of the chemical gypsum calcined without any free water and with 25% free water content showed a general lowering of the height of the most frequent particle size range peaks and a general fattening of the normal distribution curve. Scanning electron microscopic examination showed that above about 20% free water content the stucco particles began to take on a "fuzzy" appearance. FIGS. 2 and 3 show a comparison between the stuccos from calcining dry chemical gypsum (FIG. 3) and the 25% free water chemical gypsum (FIG. 2) and clearly show the "fuzzy" appearance obtained in this very wet material which also showed an increase in Blaine surface area.

In another series of evaluations, an aliquot of chemical gypsum was thoroughly washed, allowed to drain to 20% free water content and calcined. In comparison, a portion of the washed chemical gypsum was thoroughly dried before calcination, and in further comparison an aliquot of dry mineral gypsum was calcined with a portion being wetted to 20% free moisture and thoroughly redried before calcination. Exemplary results are as follows:

| | Washed Chemical Gypsum | | Washed Mineral Gypsum | |
|---|---|---|---|---|
| | Dry | Wet (20%) | Dry | Redried |
| Dispersed Consistencies in ml/100 g. | | | | |
| 7 seconds | 124 | 95 | 127 | 145 |
| 60 seconds | 195 | 138 | 193 | 197 |
| Blaine Surface Area in cm²/g. | 1743 | 1758 | 3100 | 1667 |

The wet chemical gypsum feed resulted in a stucco with 20% less dispersed consistency. That is 20% less by weight mixing water was required for a fluid mixture for rehydration. The Blaine surface area had also increased slightly.

In a further evaluation, an aliquot of pre-dried chemical gypsum was fed to the continuous kettle calciner with a separate stream of water entering the calciner along-side the gypsum feed, the water being added at a rate corresponding to 20% of the gypsum feed. In comparison a portion was calcined without the water feed. Exemplary results were:

| | Wet (20%) | Dry |
|---|---|---|
| Dispersed Consistencies in ml/100 g. | | |
| 7 seconds | 100 | 125 |
| 60 seconds | 153 | 192 |
| Blaine Surface Area in cm²/g. | 1746 | 1522 |

From this it may be seen that dry chemical gypsum may be wetted to appropriate moisture levels as it enters the continuous calciner to achieve the lowered water demand stucco advantages of the invention. Here the wet stucco had 20% less water demand and 15% increased surface area.

In still another evaluation a natural gypsum mineral powder, ground to 2100 cm²/g. Blaine surface area was wetted just before feeding to the continuous calciner. In comparison, an aliquot was conventionally dry fed. Exemplary results were:

| | Natural Gypsum | |
|---|---|---|
| | Wet (20%) | Dry |
| Dispersed Consistencies in ml/100 g. | | |
| 7 seconds | 95 | 127 |
| 60 seconds | 134 | 193 |
| Blaine surface area in cm²/g | 2019 | 3128 |

Here it may be seen that mineral gypsum source may be used to achieve the advantages of the present invention. Water demand decreased 25–30% and Blaine surface area here decreased probably indicative of the wetting water dissolving fines in the powdered gypsum.

EXAMPLE 2

In a second series of evaluations, a large supply of the chemical gypsum of Example 1 was processed through plant size equipment. A 12 inch diameter hole had been cut in the top of the continuous kettle calcination vessel and a moving belt conveyor, actuated to start and stop in response to the kettle calcining overflow temperature control, was used to automatically feed wet chemical gypsum from ground level storage into the top of the kettle. A second exhaust draft line was installed in addition to the primary draft exhaust to pull about one inch of water draft on the top of the kettle. The kettle was initially started with ground mineral gypsum; and once steady state operation was achieved, wet chemical gypsum feed commenced. The wet chemical gypsum cake, containing variable moistures from 11 to over 18% free water, was metered into the kettle at rates of 11, 12, 14 and 16 tons per hour in response to overflow temperatures ranging from 278° F. to 295° F. (137°–146° C.) and 8.5–11 tons per hour stucco discharge rate, and compared to conventional dry mineral gypsum powder ordinarily used at this plant and an aliquot of pre-dried chemical gypsum. Exemplary results were:

| Dispersed Consistencies in ml/100 g. | Chemical Gypsum | | Dry Mineral Gypsum |
|---|---|---|---|
| | Wet (11–18%) | Dry | |
| 7 seconds | 90 | 97 | 108 |
| 60 seconds | 120 | 144 | 160 |

The wet feed chemical gypsum resulted in a stucco with 10–15% respectively lowered water demand (7 seconds mixing and 60 seconds mixing).

An aliquot of the stucco from the wet chemical gypsum feed of this example was compounded into a formulated building plaster product. In general, slightly more retarder was required to bring setting time to normal for mineral gypsum products at this plant. However all other physical properties of the formulated products (dispersed consistencies, mortar consistencies, strengths etc.) were comparable.

Another aliquot of the stucco from the wet chemical gypsum feed was compounded into a formulated industrial plaster product. The working properties, mortar consistencies and other physical properties were similar to conventionally produced mineral gypsum stucco products with the exception that 60 seconds dispersed consistency was reduced 17%.

An aliquot of the stucco from the unground wet chemical gypsum feed was passed onto gypsum board manufacture. Pretesting a sample of the material showed slightly slower temperature rise sets when formulated with the customary gypsum board manufacture ingredients. Slowing the line speed about 13% compensated for the slower rate of set of this reduced water demand material due to the type and quality of available accelerators resulting in satisfactory gypsum board production. Water required to maintain fluidity was reduced about 8% in comparison to ordinary dry mineral gypsum stucco. The produced board was satisfactory in all characteristics.

What is claimed is:

1. The process for continuously calcining gypsum to beta hemihydrate which consists essentially of initially charging a continuous atmospheric pressure kettle calciner with gypsum; heating the gypsum in the kettle to the required calcining and fluidizing temperature to cause the gypsum to calcine to beta hemihydrate; and
when the gypsum in the kettle has calcined to beta hemihydrate and been withdrawn from the kettle, adding a substantially continuous stream of wet gypsum to the upper strata of the mass in the kettle and withdrawing a substantially continuous stream of beta hemihydrate having a lower dispersed consistency than the initials discharge of hemihydrate, the wet gypsum containing from about 5 to about 40% by weight of associated free water.

2. The process of claim 1 in which the wet gypsum is chemical gypsum.

3. The process of claim 1 in which the wet gypsum is natural mineral gypsum.

4. The process of claim 1 in which the wet gypsum contains about 10–25% by weight associated free water.

5. The process of claim 1 in which a slurry of gypsum containing greater than about 40% by weight associated free water is blended with gypsum containing less water to produce a wet gypsum containing from about 5 to about 40% by weight of associated free water and which is fed to the kettle.

6. The process of claim 5 in which wet gypsum is blended with water to obtain a wet gypsum blend containing about 10–25% by weight associated free water and the blend is fed to the kettle.

7. The process of claim 1 in which substantially continuous streams of gypsum and water are added to the upper strata of the mass in the kettle, the streams being proportioned to result in feeding the kettle with a gypsum containing at least 5% by weight of associated free water.

8. The process of claim 7 in which the streams of gypsum and water are proportioned to feed the kettle with a gypsum containing about 10–25% by weight associated free water.

9. The process of continuously calcining ground mineral gypsum containing water soluble impurities to produce beta hemihydrate of reduced water soluble impurities consisting essentially of:
washing the ground mineral gypsum with sufficient water as to reduce water soluble impurities present in the gypsum;
partially draining the washed gypsum to obtain a wet water gypsum blend of about 5% to about 40% of free water based on the weight of the gypsum;
directly feeding the blend into the continuous calciner and withdrawing beta hemihydrate having reduced water soluble impurities and a lower dispersed consistency than an initial discharge of hemihydrate.

* * * * *